United States Patent Office 2,788,284
Patented Apr. 9, 1957

2,788,284
REFRACTORIES AND MATERIAL FOR THE MANUFACTURE THEREOF

Raymond Frederick Hilton, Red Hill, and Edward Charles Martin, London, England, assignors to The Morgan Crucible Company Limited, London, England, a company of Great Britain No Drawing. Application November 27, 1950, Serial No. 197,824

Claims priority, application Great Britain November 29, 1949

7 Claims. (Cl. 106—57)

This invention relates to improved refractories and material for the manufacture thereof.

The object of the invention is to provide a refractory material of very high melting point which can be fired at ordinary practical high temperatures to produce refractories which are substantially non-porous and have high resistance to basic substances and various molten metals.

It is known that thorium oxide, whose melting point is 3050° C., has a high resistance to basic substances and certain molten metals, such as titanium, which attack other refractory materials.

However, thorium oxide requires a very high temperature of firing to produce stable refractories. In fact the minimum temperature required to stabilize thorium oxide refractories and render them non-porous is not accurately known, but it is well above 2000° C.

Thorium oxide ware, even when fired to a temperature as high as 1850° C. is still weak and porous, having a porosity of over 30%. Consequently a thermocouple tube, for example, is too permeable to prevent the thermocouple being attacked by gas present in a furnace. Similarly a crucible is not suitable for fluid melts because of the porous nature of the crucible. Further this porosity increases the surface area of the material in contact with and exposed to the attack of the molten charge.

The object of the invention is achieved by adding to thorium oxide a small proportion of an oxide of another metal of group IV(a) of the periodic table. Zirconium oxide and titanium dioxide are the preferred oxides to add, and a suitable proportion in either case is about 2½% of the weight of the mixture. Generally the amount of the addition should be greater than 1% and less than 10%, or in the case of zirconium oxide less than 5%.

It will be understood that instead of adding the oxides as such, there may be added the chemically equivalent amounts of compounds of the metals concerned which are converted to the oxides during heating to the firing temperature. Such compounds may be inorganic or organic. Examples in the case of zirconium are zirconium oxychloride and fatty acid salts of zirconium.

The added oxide, or compound liberating the same, is intimately mixed with the thorium oxide and shaped into the required refractory article by any of the methods known to the ceramic art. The materials of the mixture are preferably both in a very finely divided state because the finer the particle size the lower the firing temperature needs to be. Wet mixing is preferred to dry mixing because the former takes less time than the latter to produce the necessary intimate admixture and, in any case, the mixture is required to contain sufficient liquid to render it plastic for shaping.

For example, refractory tubes closed at one end were made from the following mixture:

| | Percent |
|---|---|
| Thorium oxide | 97.5 |
| Zirconium oxide | 2.5 |
| Soluble starch (temporary binder) | +2 |

The ingredients, each so finely divided as to pass a 300-mesh sieve, were thoroughly mixed together with sufficient water to render the mixture sufficiently plastic to enable it to be formed into the tubes, which were then kilned to a temperature of 1800° C. These tubes had the following characteristics compared with similar tubes made entirely of thorium oxide fired to the same temperature:

| | Thorium oxide | Thorium oxide, 2.5% zirconium oxide |
|---|---|---|
| Shrinkage during firing | 22% | 33%. |
| Porosity | 31% | nil. |
| Pressure required to force air through the tube. | 4 lbs./sq. in. | No leak at maximum test pressure of 30 lbs./sq. in. |

Similar results are obtained if the zirconium oxide used in this example is replaced by the same amount of titanium dioxide.

We claim:

1. Process for the manufacture of non-porous refractories consisting essentially of the steps of intimately mixing thorium oxide with from 1% to 5% based on the weight of the mixture, of an oxide selected from the group consisting of zirconium oxide and titanium oxide, adding an amount of water to render the mixture sufficiently plastic to be directly formed into a self-supporting coherent shaped mass, directly forming the mixture into the desired shape, and thereupon firing it at a temperature between about 1800° C. and about 2000° C.

2. Process as claimed in claim 1, in which a water soluble temporary binder is included in the mixture.

3. Process as claimed in claim 1 in which a water soluble starch is included in the mixture.

4. Process for the manufacture of non-porous refractories consisting essentially of the steps of intimately mixing thorium oxide with from 1% to 5% based on the weight of the mixture, of an oxide selected from the group consisting of zirconium oxide and titanium oxide, adding an amount of water to render the mixture sufficiently plastic to be directly formed into a self-supporting coherent shaped mass, directly forming the mixture into the desired shape and thereupon firing it at a temperature of about 1800° C.

5. Process for the manufacture of non-porous refractories consisting essentially of the steps of intimately mixing thorium oxide with a compound of a metal selected from the group consisting of zirconium and titanium which is convertible by heat to the oxide of said metal, the amount of said compound being such as to produce the oxide in an amount which is 1% to 5% based on the weight of the mixture, adding an amount of water to render the mixture sufficiently plastic to be directly formed into a self-supporting coherent shaped mass, directly forming the mixture into the desired shape, and thereupon firing it at a temperature between about 1800° C. and about 2000° C.

6. Process as claimed in claim 5 in which the firing temperature is about 1800° C.

7. Process as claimed in claim 5 in which a water soluble temporary binder is included in the mixture.

References Cited in the file of this patent

UNITED STATES PATENTS

| 1,554,225 | Marden | Sept. 22, 1925 |
| 1,585,779 | Marden | May 25, 1926 |
| 1,695,812 | Marden | Dec. 18, 1928 |
| 2,341,561 | Kinzie et al. | Feb. 15, 1944 |

FOREIGN PATENTS

| 443,956 | France | 1912 |